(12) United States Patent
Abdulally

(10) Patent No.: US 8,555,797 B2
(45) Date of Patent: Oct. 15, 2013

(54) SYSTEM AND METHOD FOR DECREASING NO$_x$ EMISSIONS FROM A FLUIDIZED BED COMBUSTION SYSTEM

(75) Inventor: Iqbal F. Abdulally, Avon, CT (US)

(73) Assignee: Alstom Technology Ltd (CH)

(\*) Notice: Subject to any disclaimer, the term of this patent is extended or adjusted under 35 U.S.C. 154(b) by 1630 days.

(21) Appl. No.: 11/747,010

(22) Filed: May 10, 2007

(65) Prior Publication Data

US 2008/0276842 A1   Nov. 13, 2008

(51) Int. Cl.
*F23J 15/00* (2006.01)
(52) U.S. Cl.
USPC ............ 110/215; 110/297; 110/345; 110/348
(58) Field of Classification Search
USPC .................................. 110/345, 216; 422/147
See application file for complete search history.

(56) References Cited

U.S. PATENT DOCUMENTS

| | | | |
|---|---|---|---|
| 4,985,218 A | 1/1991 | DeVita | |
| 5,462,718 A | 10/1995 | Abdulally | |
| 5,553,557 A | 9/1996 | Abdulally | |
| 5,681,536 A * | 10/1997 | Swoboda et al. | ............ 422/168 |
| 6,067,943 A | 5/2000 | Morin et al. | |
| 6,569,388 B1 * | 5/2003 | Fan et al. | ...................... 422/171 |
| 6,960,329 B2 | 11/2005 | Sellakumar | |

FOREIGN PATENT DOCUMENTS

| | | |
|---|---|---|
| WO | WO 91/00134 | 1/1991 |
| WO | WO 2005/001338 | 1/2005 |
| WO | WO 2006/134134 | 12/2006 |

OTHER PUBLICATIONS

PCT International Search Report and the Written Opinion of the International Searching Authority dated Aug. 22, 2008—(PCT/US2008/060995).

\* cited by examiner

*Primary Examiner* — Kenneth Rinehart
*Assistant Examiner* — David J Laux
(74) *Attorney, Agent, or Firm* — Cantor Colburn LLP

(57) ABSTRACT

Disclosed herein is a NO$_x$ reducing system comprising a first inner conduit in fluid communication with a reactant source; and a first outer conduit comprising an open end for receiving the first inner conduit and a closed end; the first outer conduit comprising a port for discharging reactant from the reactant source into an exhaust gas stream. Also disclosed herein is a NO$_x$ reducing system comprising a conduit comprising a closed end and an open end that is in fluid communication with a reactant source; the conduit comprising a port for discharging reactant from the reactant source into an exhaust gas stream; the port being located on a downstream surface of the first outer conduit.

27 Claims, 6 Drawing Sheets

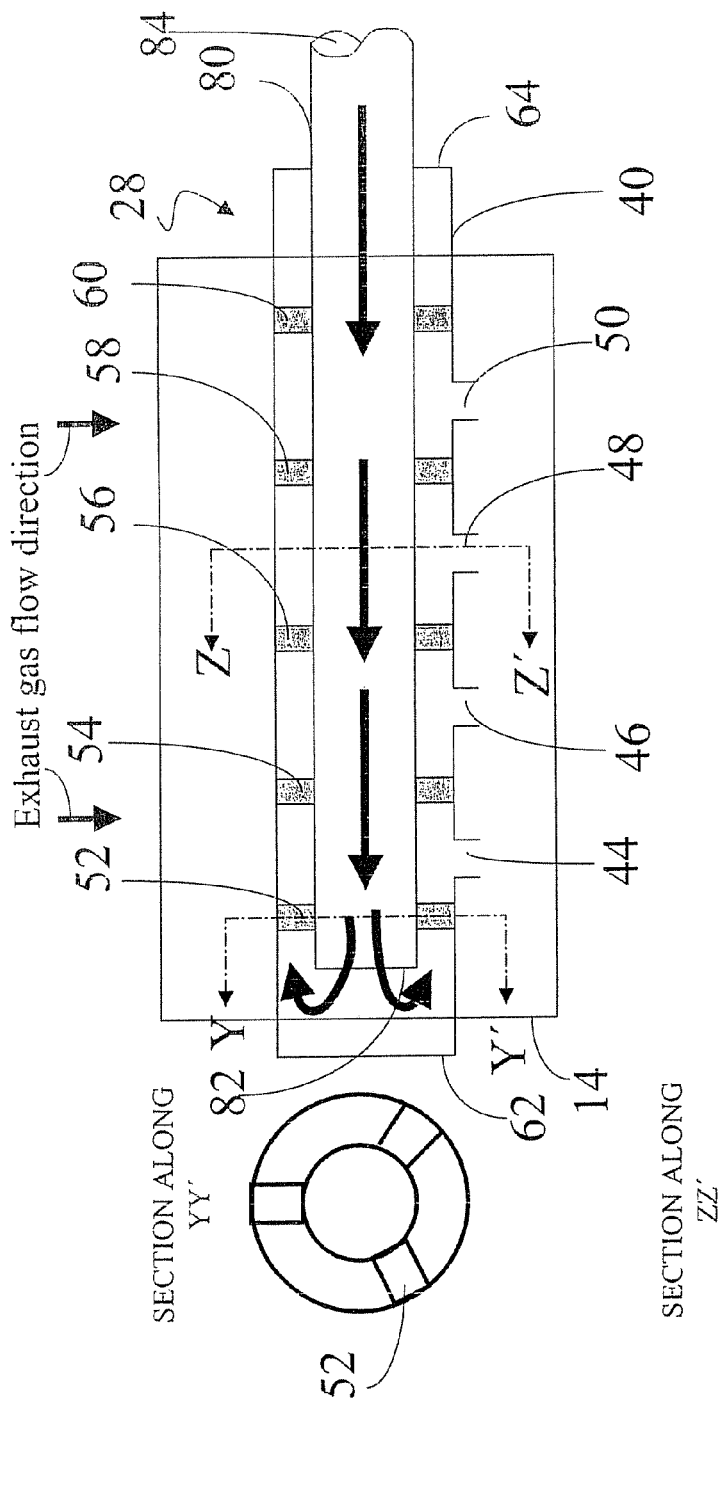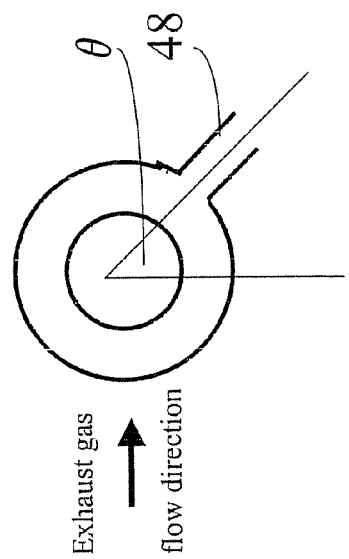
Figure 5

ND METHOD FOR DECREASING
$NO_x$ EMISSIONS FROM A FLUIDIZED BED
COMBUSTION SYSTEM

BACKGROUND

This disclosure relates to a method for decreasing nitrogen oxide ("$NO_x$") emissions from a fluidized bed combustion system. In particular, this disclosure relates to the selective injection of a reactant into the combustion system for reducing $NO_x$ levels in the gaseous products of combustion in the fluidized bed combustion system.

FIG. 1 is a schematic depiction of the prior art and shows a fluidized bed combustion system 100. In the circulating fluidized bed combustion system 100, fuel, bed material and possible sorbent material are fluidized in a furnace 2 with fluidizing air, which is introduced to the furnace 2 via an air introduction port 20. In general, air is introduced to the furnace 2 through various introduction ports located at different levels of the furnace 2, but for clarity, the FIG. 1 only depicts a single means for introducing air into the furnace 2. Exhaust gases produced in the furnace 2 and other particulate matter entrained in the exhaust gases are discharged through a solids separator inlet duct 4 in the elevated portions of the furnace 2 to a solids separator 8. In the solids separator 8, which is usually a cyclone, most of the particulate matter is separated from the exhaust gases and returned to the furnace 2 via a solids return duct 6.

The exhaust gases are led from the solids separator 8 through an outlet duct 14 to an exhaust gas duct 18, which comprises heat transfer surfaces (not shown) for cooling the exhaust gases and for producing steam that may be used for heating the fluidized air respectively. Exhaust gases produced in the furnace 2 generally contain $NO_x$, which is environmentally unfriendly. It is therefore desirable to neutralize the $NO_x$ prior to venting any portion of the exhaust gases into the atmosphere. Urea, aqueous or anhydrous ammonia (hereinafter ammonia), or other reagents having an ammonium radical are generally used to neutralize $NO_x$.

To reduce $NO_x$ emission levels, selective non-catalytic reduction ("SNCR") methods and selective catalytic reduction methods ("SCR") are employed. In SNCR methods, a reactant such as urea or ammonia is injected into the combustion system to react with the $NO_x$, forming nitrogen ("$N_2$") and water ("$H_2O$"). The reactant is generally injected through numerous ports at various locations across the combustion system including the furnace, the separator, and the duct connecting the furnace and separator.

With reference once again to the FIG. 1, the reactant (for the neutralization of $NO_x$) is generally introduced into the fluidized bed combustion system 100 either in the inlet duct 4 via a port 22, or directly to the solids separator 8 via another port 24 or at the top 12 of the vortex finder 16 located in a dome at the upper end of the solids separator 8. Each of these points of introduction has drawbacks.

For example, inefficient utilization of the reactant often prevents the SNCR methods from obtaining the desired degree of decrease in $NO_x$ levels. For more efficient usage of the reactant, it is desirable to have a high residence time of the reactant in the system, a high degree of mixing of the reactant with the $NO_x$-containing exhaust gases, and a low degree of mixing of the reactant with the particulate materials circulating in the system. Present systems often suffer from inefficient use of the reactant. For example, systems that inject the reactant into the furnace 2 and systems that inject the reactant into various locations across the inlet duct 4 may suffer from too much mixing of the reactant with the particulate materials and insufficient mixing of the reactant with the $NO_x$-containing exhaust gases. Similarly, systems that inject the reactant into the solids separator 8 or at the top 12 of the vortex finder 16 may suffer from insufficient distribution and residence time and from insufficient mixing of the reactant with the $NO_x$-containing exhaust gases. All such system have injection ports or lances that do not penetrate sufficiently into the bulk on the gas duct because of concerns with high temperature and clogging of the ports. Inefficient utilization of the reactant results in excessive use of the reactant, which adds to the cost of the SNCR method. Additionally, adding excessive amounts of the reactant can generate new pollution problems.

The high temperatures encountered in the furnace 2 and the solids separator 8 often limit the materials and the types (e.g., designs) of $NO_x$ reducing systems that can be introduced for reducing the $NO_x$ content in the exhaust gas stream. In addition, the high particulate content in the exhaust gas stream also results in a degradation of $NO_x$ reducing systems, thus reducing the life cycle of such devices and increasing the amount of maintenance that is to be conducted on the fluidized bed combustion system 100.

It is therefore desirable to have a system that permits sufficient distribution and mixing of the reactant with the $NO_x$-containing exhaust gases to reduce the $NO_x$ content in the exhaust gas stream. It is also desirable to have a $NO_x$ reducing system that has a robust design that can withstand operating temperatures in the fluidized bed combustion system 100 and that can withstand the degrading effects of the particulates present in the exhaust gases.

SUMMARY

Disclosed herein is a $NO_x$ reducing system comprising a first inner conduit in fluid communication with a reactant source; and a first outer conduit comprising an open end for receiving the first inner conduit and a closed end; the first outer conduit comprising a port for discharging reactant from the reactant source into an exhaust gas stream.

Disclosed herein too is a $NO_x$ reducing system comprising a conduit comprising a closed end and an open end that is in fluid communication with a reactant source; the conduit comprising a port for discharging reactant from the reactant source into an exhaust gas stream; the port being located on a downstream surface of the first outer conduit.

Disclosed herein too is a fluidized combustion bed system comprising a furnace; a solids separator in fluid communication with the furnace; the furnace comprising a vortex finder; and an outlet duct in fluid communication with the vortex finder; the outlet duct having a $NO_x$ reducing system located downstream of the vortex finder, wherein the $NO_x$ reducing system comprises a first inner conduit in fluid communication with a reactant source; and a first outer conduit comprising an open end for receiving the inner conduit and a closed end; the first outer conduit comprising a port for discharging reactant from the reactant source into an exhaust gas stream; the port being located on a downstream surface of the first outer conduit.

Disclosed herein too is a method comprising injecting a reactant from a reactant source into a $NO_x$ reduction system that comprises a first inner conduit in fluid communication with the reactant source; and a first outer conduit comprising an open end for receiving the first inner conduit and a closed end; the first outer conduit comprising a port for discharging reactant from the reactant source into an exhaust gas stream;

the port being located on a downstream surface of the first outer conduit; and discharging the reactant from the port into the exhaust gas stream.

BRIEF DESCRIPTION OF FIGURES

With reference now to the figures where all like parts are numbered alike;

FIG. 5 depicts one embodiment of the outlet duct 14 containing a single supply line 28.

DETAILED DESCRIPTION

The use of the terms "a" and "an" and "the" and similar references in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Disclosed herein is a $NO_x$ reducing system for a fluidized combustion bed system that comprises a reactant supply line that is disposed in the outlet duct of the separator and that is located downstream of the vortex finder outlet of the separator. In an exemplary embodiment, the $NO_x$ reducing system comprises a plurality of supply lines through which the reactant is discharged into the outlet duct of the separator. Each supply line comprises a concentric set of conduits through which the reactant is discharged. The inner conduit operating at relatively low temperature advantageously provides stiffness and stability to the supply lines at the elevated operating temperatures of the fluidized bed combustion system.

The use of a concentric set of conduits provides the $NO_x$ reducing system with a robust design that can withstand the elevated temperatures of the fluidized bed combustion system without any significant adverse dimensional distortion of the supply lines. In addition, the design of the $NO_x$ reducing system advantageously minimizes degradation such as blockage and wear brought on by particulate matter that is generally transported by the exhaust gases. The system also advantageously permits a uniform or a biased distribution of the reactant in the exhaust gas stream as it travels through the outlet duct.

Figure 1:
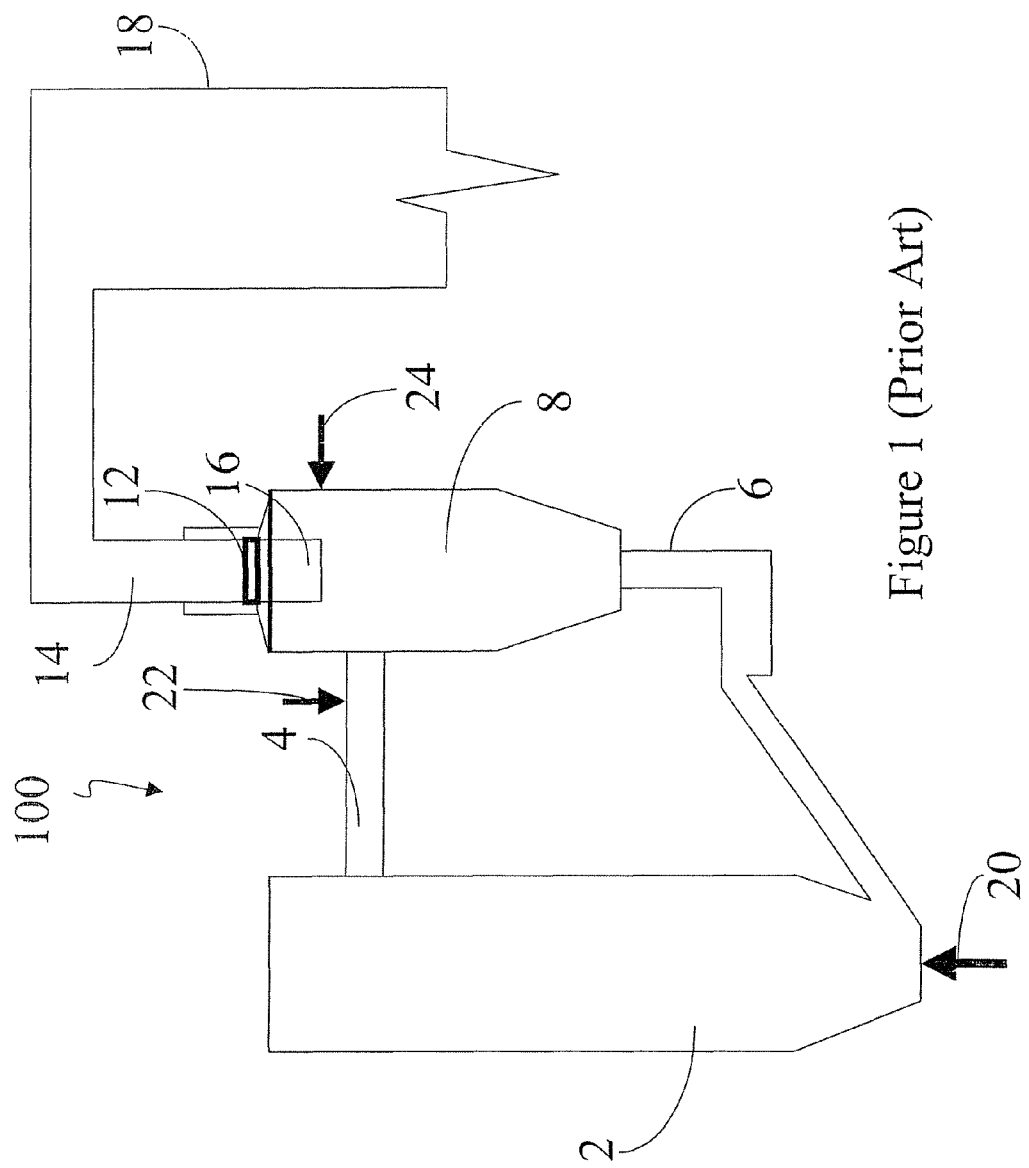
FIG. 1 is a schematic depiction of the prior art and shows a fluidized bed combustion system.
Figure 2:
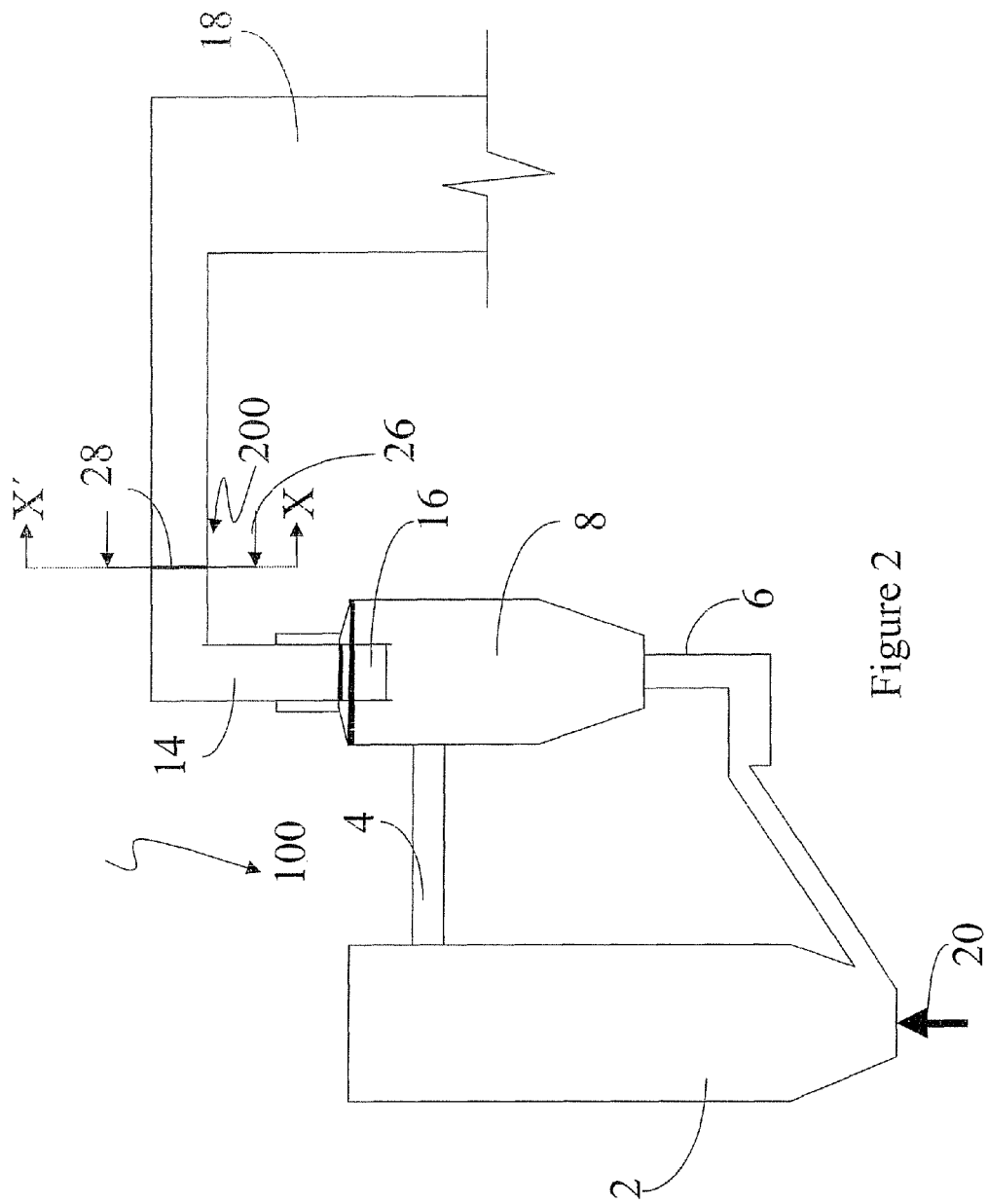
FIG. 2 depicts a $NO_x$ reducing system 200 that comprises a supply line 28 or a plurality of supply lines located in the outlet duct 14 downstream of the vortex finder outlet 16 of the separator 8.

With reference now to the FIG. 2, the $NO_x$ reducing system 200 comprises a reactant injection line 26 that is in fluid communication with a supply line 28 or a plurality of supply lines located in the outlet duct 14 immediately downstream of the vortex finder outlet 16 of the separator 8.

Figure 3:
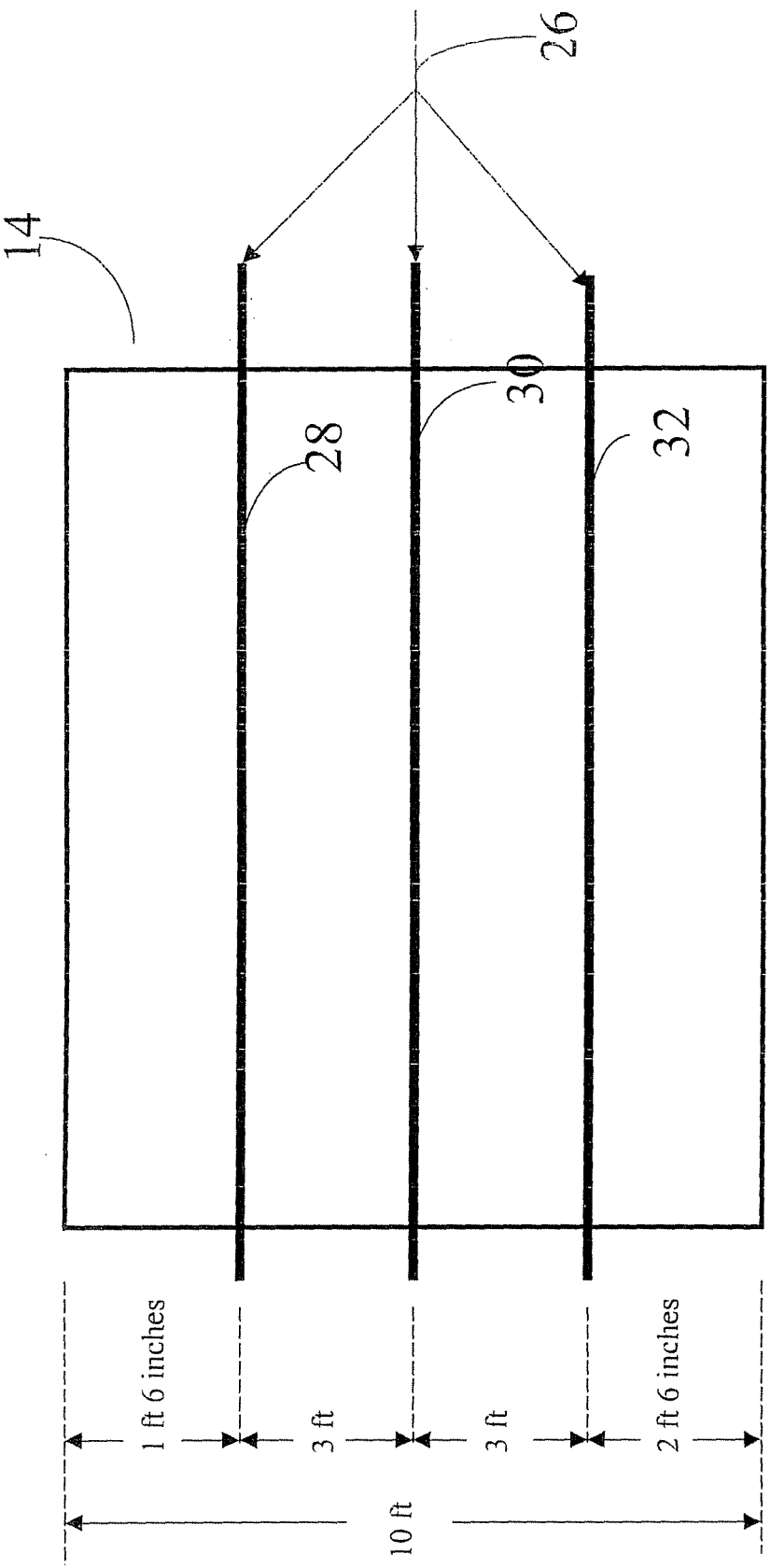
FIG. 3 is a cross-sectional view of the $NO_x$ reducing system 200 comprising single supply lines 28, 30 and 32 taken at section XX' from FIG. 2.

FIG. 3 is a cross-sectional view of the $NO_x$ reducing system 200 taken at section XX' from FIG. 2. As can be seen the reactant is discharged into the outlet duct 14 via a plurality of single supply lines 28, 30 and 32 that are in fluid communication with a source of the reactant via the reactant injection line 26. While the FIG. 3 depicts a plurality of supply lines 28, 30 and 32, a single supply line 30 may be used as well. The supply lines can be disposed horizontally, vertically or at any angle therebetween. While the FIG. 2 shows that the supply lines can be disposed in a single plane, they can be disposed in multiple planes if desired. For example, the supply lines can be disposed in a staggered configuration in the duct if desired. The supply lines 28, 30, 32, may pass through both walls of the outlet duct 14 as depicted in the FIGS. 2 and 3 or may pass through only a single wall of the outlet duct.

Figure 4:
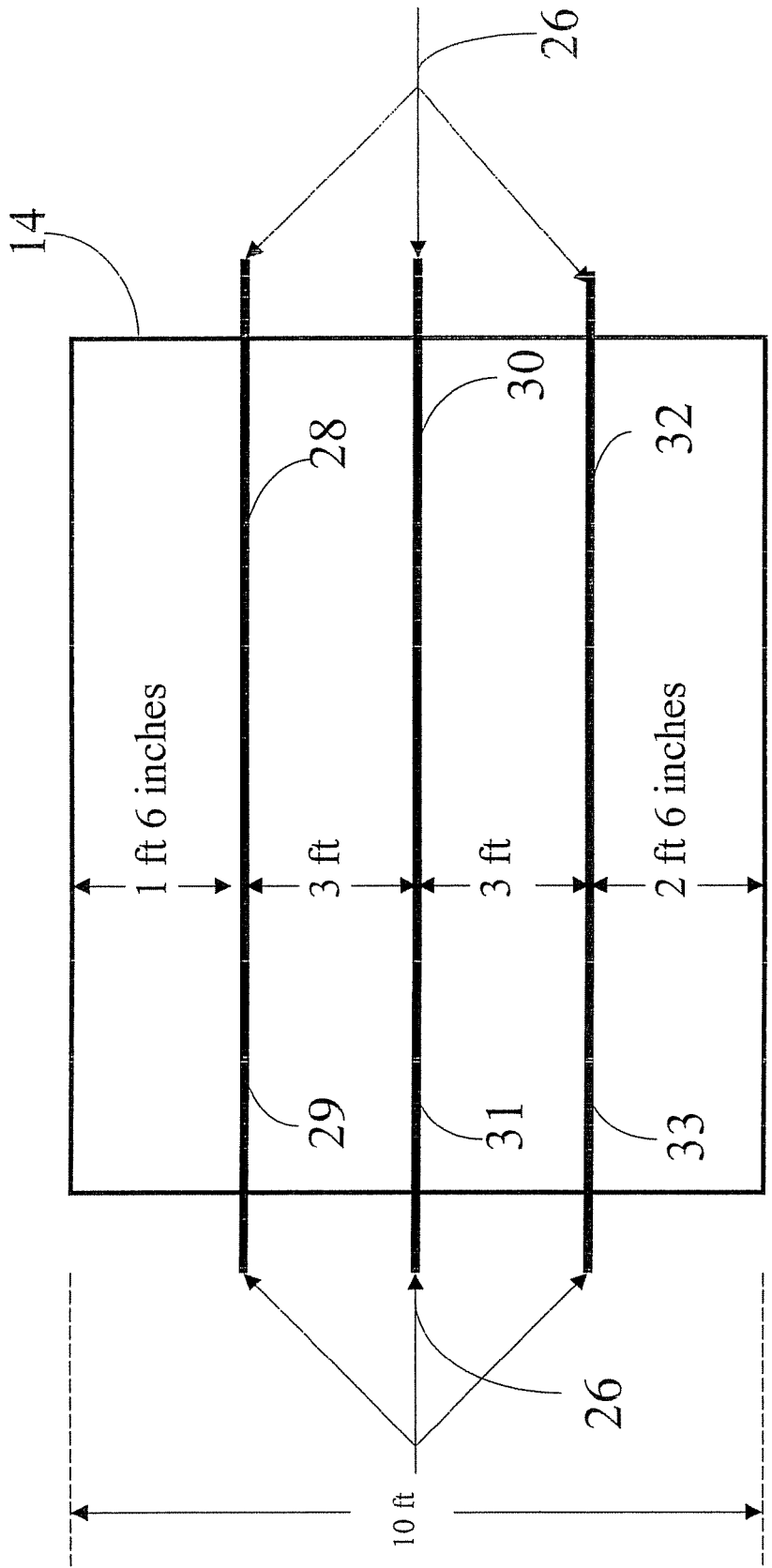
FIG. 4 is a cross-sectional view of the $NO_x$ reducing system 200 comprising opposedly disposed supply lines 28 and 29; 30 and 31; and 32 and 33 taken at section XX' from FIG. 2.

While the FIG. 3 shows a plurality of single supply lines 28, 30 and 32, it is also possible to have opposedly disposed supply lines 28 and 29; 30 and 31; and 32 and 33 disposed in the outlet duct 14 as shown in the FIG. 4. Opposedly disposed supply lines are discussed later in the FIG. 6. It is to be noted that when the fluidized bed combustion system is run under less demanding conditions, the first inner conduit 80 can be eliminated with the reactant injection line 26 directly connected to the first outer conduit 40.

As shown in the FIGS. 3 and 4, it is generally desirable to have an average of about 1 to about 5 supply lines per 10 linear feet of height of the outlet duct 14, specifically about 4 supply lines per 10 linear feet of height of the outlet duct 14, and more specifically about 3 supply lines per 10 linear feet of height of the outlet duct 14. In exemplary embodiments depicted in the FIGS. 3 and 4, for a duct having a height of 10 feet, the first supply line 28 (or opposedly disposed supply lines 28 and 29) is located closer to the upper surface of the outlet duct than the third supply line 32 (or opposedly disposed supply lines 32 and 33) is located to the lower surface of the outlet duct. The second supply line 30 is located above the mid-point of the height of the outlet duct 14.

In one embodiment, the supply lines may be evenly distributed in the outlet duct. In another embodiment, the supply lines can be concentrated in one or more portions of the outlet duct. The supply lines can be distributed in any spacing in any plane based on measurements or computer modeling of exhaust gas flow or of $NO_x$ distribution in the exhaust gas stream. In an exemplary embodiment depicted in the FIGS. 3 and 4, for a duct having a height of 10 feet, the first supply line 28 (or opposedly disposed supply lines 28 and 29) is located closer to the upper surface of the outlet duct than the third supply line 32 (or opposedly disposed supply lines 32 and 33) is located to the lower surface of the outlet duct. The second supply line 30 is located above the mid-point of the height of the outlet duct 14.

As shown in the FIGS. 3 and 4, the first supply line 28 (or opposedly disposed supply lines 28 and 29) is disposed at a distance of about 1 foot to about 2 feet from the upper surface of the outlet duct 14, while the third supply line 32 (or opposedly disposed supply lines 32 and 33) is disposed at a distance of about 2 feet to about 3 feet from the lower surface of the outlet duct 14. In a preferred embodiment, the first supply line 28 (or opposedly disposed supply lines 28 and 29) is disposed at a distance of about 1 foot and 6 inches from the upper surface of the outlet duct 14, while the third supply line 32 (or opposedly disposed supply lines 32 and 33) is disposed at a distance of about 2 feet and 6 inches from the lower surface of the outlet duct 14.

FIG. 5 depicts one embodiment of the outlet duct 14 containing a single supply line 28. As can be seen in the FIG. 5, the supply line comprises two conduits—a first outer conduit 40 and a first inner conduit 80. The first outer conduit 40 comprises a first end 62 and a second end 64 and has a plurality of ports 44, 46, 48, 50, and a plurality of spacers 52, 54, 56, 58, and 60 disposed between the first end 62 and the second end 64. The first end or closed end 62 of the first outer conduit 40 is closed and serves to direct the reactants into the space between the first outer conduit 40 and the first inner conduit 80 as depicted in the FIG. 5. The second end or open end 64 of the first outer conduit 40 has an opening to receive the first inner conduit 80. In one embodiment, the second end 64 of the first outer conduit 40 is fixedly attached to and in intimate contact with the outer surface of the first inner conduit 80 to form an air or fluid tight seal. In another embodiment, the second end 64 of the first outer conduit 40 is fixedly attached to the outer surface of the first inner conduit 80 but does not form an air or fluid tight seal.

The first outer conduit 40 preferably has a cylindrical cross sectional area and comprises a material that can withstand the high temperatures, and the erosive and corrosive environment of the fluidized combustion bed system. In one embodiment, it is desirable for the material to withstand temperatures of about 500 to about 2,200° F. An exemplary material is a stainless steel such as SS309.

It is desirable for the first outer conduit 40 to have an inner diameter of about 2.5 to about 15 centimeters, specifically about 5 to about 12 centimeters and more specifically about 8 to about 10 centimeters. A preferred inner diameter is about 10 centimeters. It is desirable for the first outer conduit 40 to have a wall thickness of about 2.5 to about 15 millimeters, specifically about 5 to about 12 millimeters and more specifically about 8 to about 10 millimeters. A preferred wall thickness is about 9 millimeters.

The ports may be disposed on any portion of the surface of the first outer conduit 40. They may be distributed on the upstream side of the supply line 28 or on the downstream side of the first outer conduit 40. They may be distributed all around the outer surface of the first outer conduit 40. In a preferred embodiment, the plurality of ports 44, 46, 48 and 50 are disposed on the outer surface of the first outer conduit 40 and are disposed on the downstream side of the supply line 28 as shown in the cross-sectional view taken at section ZZ' depicted in the FIG. 5. The placement and orientation of the ports on the downstream side of the supply line 28 is advantageous in that it prevents the port from clogging with particulate matter contained in the exhaust gas stream. The ports 44, 46, 48 and 50 may be fitted with nozzles, nipples, spray headers, or the like, or a combination comprising at least one of the foregoing.

As shown in the FIG. 5, the central axis of each port is disposed at an angle θ to a vertical radius that starts at the center of the supply line 28 and ends at the bottom surface of the supply line 28. The angle θ can be varied in an amount of up to 360 degrees, specifically about 5 to about 175 degrees. While the respective ports can be staggered at a variety of angles between about 5 to about 175 degrees, it is preferable to have the central axis of each port inclined at an angle θ of about 40 to about 50 degrees, specifically about 45 degrees.

It is desirable for the port to have an inner diameter of about 0.635 to about 2.5 centimeters, specifically about 0.9 to about 1.85 centimeters, and more specifically about 1.25 to about 1.5 centimeters. A preferred diameter for the port is about 1.27 centimeters. It is also desirable for the port to extend radially outwards for a distance of about 0.635 to about 2.5 centimeters from the outer surface of the first outer conduit 40. A preferred radial extension is about 1.27 centimeters. It is desirable to have the ports spaced at a distance of about 1.25 to about 12 centimeters from each other, specifically about 1.9 to about 10 centimeters, and more specifically about 2.5 to about 5 centimeters. A preferred spacing for the ports is about 2.5 centimeters. The supply line 28 can have two or more ports. In one embodiment, the supply line 28 can have about 3 to about 12 ports per supply line. A preferred number of ports per supply line is 6 ports.

The density of ports is about 15 to about 200 ports per square meter (ports/m$^2$) of outlet duct 14 cross-sectional area, specifically about 25 to about 190 ports per square meter of outlet duct 14 cross-sectional area, and more specifically about 30 to about 185 ports per square meter of outlet duct 14 cross-sectional area. The ratio of port area to outlet duct 14 cross-sectional area is about 30 to 600 square centimeters per square meter (cm$^2$/m$^2$).

The spacers are in physical communication with the inner surface of the first outer conduit 40 and the outer surface of the first inner conduit 80 and provide support to the first outer conduit 40. The spacers can be used to maintain concentricity between the first outer conduit 40 and the first inner conduit 80. In a preferred embodiment, shown in the cross-sectional view taken at YY' of the FIG. 5, at least three spacers may be used in a given plane in order to support the first outer conduit 40.

With reference now again to the FIG. 5, the first inner conduit 80 has a first end (or open end) 82 and a second end 84. The first end 82 is open and permits the reactants to be discharged from the first inner conduit 80 to the first outer conduit 40. The second end 84 is in fluid communication with a source containing the reactant (not shown). A pump, fan or blower and valves (not shown) may be used for regulating the flow of reactant into the supply line 28.

The first end 82 of the first inner conduit 80 is disposed at a distance of about 0.5 to about 10 centimeters from the first end 62 of the first outer conduit 40. In one embodiment, it is desirable to have the first end 82 of the first inner conduit 80 disposed at a distance of about 1 to about 8 centimeters, specifically about 2 to about 5 centimeters and more specifically about 2.5 to about 3 centimeters from the first end 62 of the first outer conduit 40.

The first inner conduit 80 preferably has a cylindrical cross sectional area and comprises a material that can withstand the temperatures and the corrosive environment of the fluidized combustion bed system. In one embodiment, it is desirable for the material to withstand temperatures of about 500 to about 2,200° F. An exemplary material is a stainless steel such as SS309.

It is desirable for the first inner conduit 80 to have an inner diameter of about 2.5 to about 10 centimeters, specifically about 4 to about 8 centimeters and more specifically about 5 to about 7 centimeters. A preferred inner diameter is about 6.4 centimeters. It is desirable for the first inner conduit 80 to have a wall thickness of about 2 to about 10 millimeters, specifically about 4 to about 8 millimeters and more specifically about 5 to about 7 millimeters. A preferred wall thickness is about 5 millimeters.

Figure 6:
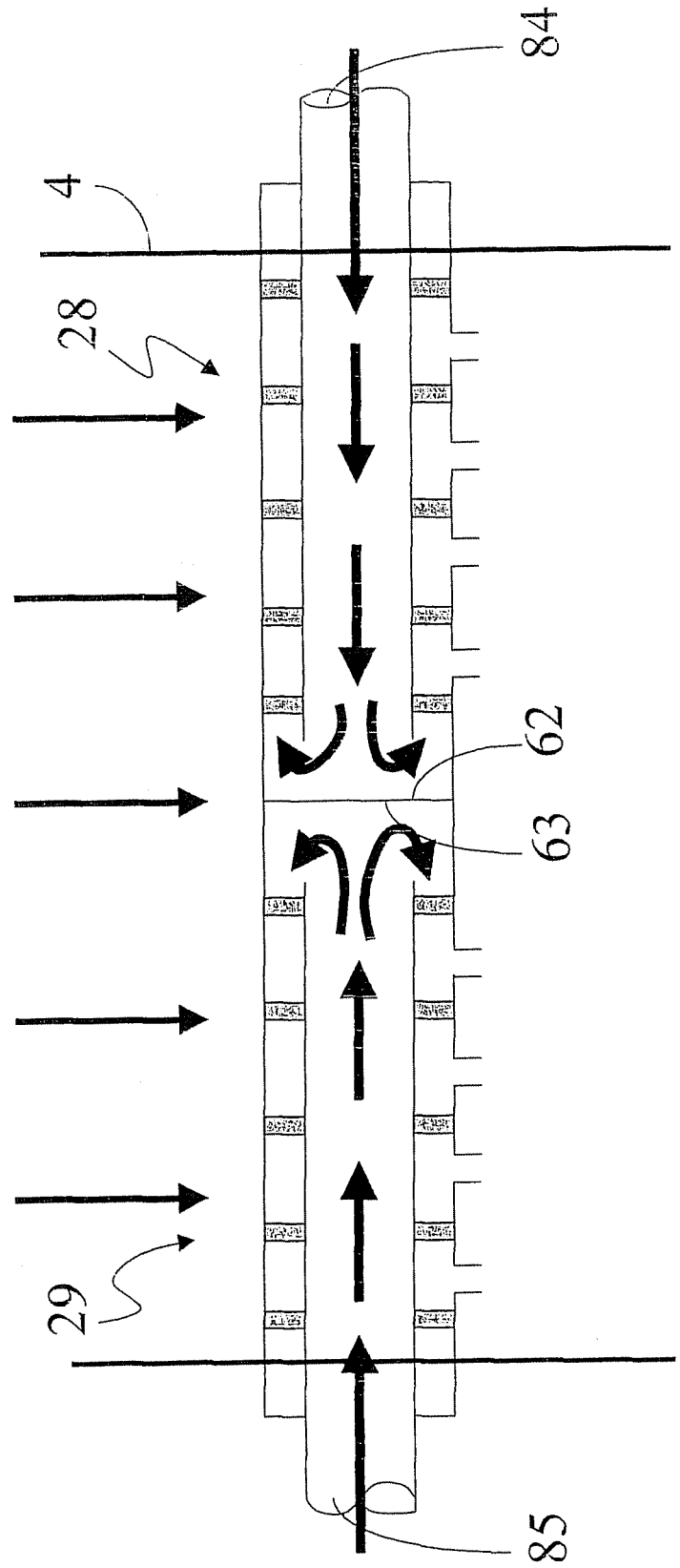
FIG. 6 is a schematic depiction of a first supply line 28 and a second supply line 29 that enter the outlet duct 14 through opposing vertical walls of the outlet duct 14.

In an exemplary embodiment, the outlet duct 14 can have two supply lines that are opposingly disposed and through which the reactant can be discharged to reduce the levels of NO$_x$. FIG. 6 is a schematic depiction of a first supply line 28 and a second supply line 29 that enter the outlet duct 14 through opposing vertical walls of the outlet duct 14. Both supply lines 28 and 29 comprise a plurality of ports and a plurality of spacers as described above. As can be seen in the FIG. 6, the opposing first ends 62 and 63 of the supply lines 28 and 29 respectively are in physical communication with one other. The respective second ends 84 and 85 of the first supply line 28 and the second supply lines 29 are in fluid communication with a source containing the reactant.

The second supply line comprises a second inner conduit that is in fluid communication with the reactant source. It also comprises a second outer conduit that comprises a first end or open end for receiving the second inner conduit. The opposite end of the second outer conduit has the closed end 63. The second outer conduit, like the first outer conduit described above, comprises a port for discharging reactant from the reactant source into the exhaust gas stream In one embodiment, in one manner of proceeding, a reactant such as ammonia or urea is injected from the reactant source into the inner conduit or the respective inner conduits (when opposing supply lines are used). The reactant may be an aqueous reactant or an anhydrous reactant or any chemical consisting of an ammonium radical. Upon emerging from the first outer end of the inner conduit, the reactant is distributed into the spaces between the outer conduit and the inner conduit. After emerging from the port or the nozzle, the reactant is uniformly distributed into the exhaust gas stream. As noted above, the reactant reacts with the $NO_x$ to form nitrogen and water.

In one embodiment, when ammonia or an ammonium radical is used as the reactant, it is added to the exhaust gas stream in a reactant to air volume ratio of up to about 11%. A preferred volume ratio of the ammonia to the air is about 5.

As noted above, the reactants can be used in the aqueous form if desired. The ammonia concentration in water can be in an amount of up to 28 percent by weight (wt %). A preferred value for the ammonia concentration in water is 1 wt %.

In one embodiment, when urea is used as the reactant, it is added to the exhaust gas stream in a reactant to water weight ratio of up to about 14. A preferred weight ratio of the urea to the water is about 1. The urea concentration in water can be in an amount of up to 45 wt %. A preferred value for the urea concentration in water is 1 wt %.

In one embodiment, it is desirable to have a normalized molar stoichiometric ratio (NSR) of ammonium radicals to $NO_x$ of up to about 10; specifically about 0.5 to about 3, and more specifically about 1 to about 2. A preferred NSR is about 1.5.

The aforementioned process is advantageous in that it permits a uniform distribution of the reactant into the exhaust gas stream. The design of the $NO_x$ reducing system mitigates the influence of other factors, such as for example, the amount of particulate matter, the time for mixing, the total residence time of the reactant in the exhaust gas stream, the density of the exhaust gas stream, the velocity of the exhaust gas stream, and the like. The aforementioned design reduces the amount of ammonia slip. The ammonia slip refers to part of the unreacted ammonia that is not consumed in neutralizing the $NO_x$ that ends up in the exhaust gas stream 18.

In one embodiment, the amount of ammonia slip is reduced to less than or equal to about 10 parts per million (ppm) specifically less than or equal to about 5 ppm and more specifically less than or equal to about 2 ppm.

Another advantage provided by the present design is that inner conduit serves as a source of stiffness and rigidity for the supply lines. Since cool reactant gases pass through the inner conduit, the inner conduit operates at low temperature range of 50 to 650° F., which maintains its rigidity and this serves to mechanically support the supply line. Thus the distortion of the supply lines is minimized when the supply line is subjected to the elevated temperatures of the fluidized bed combustion system. Additionally, it eliminates the need for an elaborate intrusive support structure that will be vulnerable to the corrosion, erosion and adverse effects of high temperature.

Yet another advantage provided by the design is the reduced corrosion of the ports and/or the nozzle. The placement and orientation of the ports and/or nozzles on the downstream side of the supply line is advantageous in that it prevents the port and/or nozzles from clogging with particulate matter contained in the exhaust gas stream. The extended life cycle of the ports and/or nozzles facilitates reduced down time for maintenance and reduced costs associated with the replacement of parts.

The following example, which is meant to be exemplary, not limiting, illustrates the method of reducing $NO_x$ in an actual power plant as described herein.

Example

This example was conducted to demonstrate the viability of such a system. A system was retrofitted to a nominally 300 MW Circulating fluidized bed boiler at an East Kentucky Power station. The outlet duct had a height of 10 feet and the supply lines were spatially arranged as depicted in the FIG. 4. The outer conduit had a diameter of 4 inches and was manufactured from stainless steel (SS309). The inner conduit had a diameter of 2.5 inches and was also manufactured from stainless steel (SS309). The oppposedly disposed supply line configuration of the FIG. 4 was used to introduce anhydrous ammonia into the exhaust gas stream. The first end of the first inner conduit is disposed at a distance of about 2.54 centimeters from the first end of the first outer conduit. The outlet duct temperature was varied between 780 to 950° C. The number of ports per supply line was 6 ports. The ports were located on the downstream side of the outer conduit surfaces and were inclined at angles θ of 45 degrees.

The volume ratio of the ammonia to the air from the reactant source was set at 5. The NSR was 1.5. This system improved the $NO_x$ emission from 0.1 lbs/mm Btu down to 0.08 lbs/mm Btu while reducing the ammonia consumption and reducing the ammonia slip from greater than 25 ppm to less than 5 ppm.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A $NO_x$ reducing system comprising:
  a conduit comprising a closed end and an open end; the open end being in fluid communication with a reactant source; the conduit comprising a port for discharging reactant from the reactant source into an exhaust gas stream, wherein the port is located on a downstream side of the conduit; the downstream side being defined by a flow direction of the exhaust gas stream.

2. A fluidized combustion bed system comprising:
  a $NO_x$ reducing system comprising:
    a first inner conduit in fluid communication with a reactant source; and
    a first outer conduit comprising an open end for receiving the first inner conduit and a closed end; the first outer conduit comprising a port for discharging reactant from the reactant source into an exhaust gas stream, wherein the port is located on a downstream side of the first outer conduit; the downstream side being defined by a flow direction of the exhaust gas stream.

3. A method comprising:
injecting a reactant from a reactant source into a $NO_x$ reduction system that comprises:
a first inner conduit in fluid communication with the reactant source; and
a first outer conduit comprising an open end for receiving the first inner conduit and a closed end; the first outer conduit comprising a port for discharging reactant from the reactant source into an exhaust gas stream; wherein the port is located on a downstream side of the first outer conduit; the downstream side being defined by a flow direction of the exhaust gas stream;
and
discharging the reactant from the port into the exhaust gas stream.

4. The method of claim 3, further comprising injecting the reactant from the reactant source into the $NO_x$ reduction system that further comprises a second inner conduit in fluid communication with the reactant source; and a second outer conduit comprising an open end for receiving the second inner conduit and a closed end; the second outer conduit comprising a port for discharging reactant from the reactant source into an exhaust gas stream; the port being located on a downstream surface-side of the second outer conduit; wherein the second outer conduit is opposingly disposed to the first outer conduit; and discharging the reactant from the port into the exhaust gas stream.

5. The method of claim 3, further comprising reacting the reactant with $NO_x$ present in the exhaust gas stream.

6. The method of claim 3, wherein the discharging is conducted in an outlet duct of a separator, situated downstream of a vortex finder.

7. The method of claim 3, wherein the reactant is an ammonium radical.

8. The method of claim 7, wherein a normalized molar stoichiometric ratio of ammonium radicals to $NO_x$ is about 0.5 to about 3.

9. A $NO_x$ reducing system comprising:
a first inner conduit in fluid communication with a reactant source; and
a first outer conduit comprising an open end for receiving the first inner conduit and a closed end; the first outer conduit comprising a port for discharging reactant from the reactant source into an exhaust gas stream, wherein the port is located on a downstream side of the first outer conduit; the downstream side being defined by a flow direction of the exhaust gas stream.

10. The reducing system of claim 9, wherein the open end of the first outer conduit is fixedly attached to and in intimate contact with an outer surface of the first inner conduit.

11. The reducing system of claim 9, wherein the first outer conduit 40 has an inner diameter of about 2.5 to about 15 centimeters.

12. The reducing system of claim 9, wherein a central axis of each port is inclined at an angle of about 40 to about 50 degrees to a radius to the first outer conduit that is perpendicular to the exhaust gas stream.

13. The reducing system of claim 9, wherein the port has an inner diameter of about 0.635 to about 2.5 centimeters.

14. The reducing system of claim 9, wherein the port extends radially outwards for a distance of about 0.635 to about 2.5 centimeters from an outer surface of the first outer conduit.

15. The reducing system of claim 9, further comprising a spacer disposed between and in physical contact with the first inner conduit and the first outer conduit.

16. The reducing system of claim 9, wherein the first outer conduit comprises about 3 to about 12 ports.

17. The reducing system of claim 9, wherein a port density is about 15 to about 200 ports per square meter of a duct cross-sectional area that the reducing system is disposed in.

18. The reducing system of claim 9, wherein an open end of the first inner conduit is disposed at a distance of about 0.5 to about 10 centimeters from a closed end of the first outer conduit.

19. The reducing system of claim 9, wherein the first inner conduit has an inner diameter of about 2.5 to about 10 centimeters.

20. The reducing system of claim 9, wherein the reactant is an ammonium radical.

21. The reducing system of claim 9, further comprising a second inner conduit in fluid communication with the reactant source; and a second outer conduit comprising an open end for receiving the second inner conduit and a closed end; the second outer conduit comprising a port for discharging reactant from the reactant source into an exhaust gas stream.

22. The reducing system of claim 21, wherein the closed end of the first outer conduit is in physical communication with the closed end of the second outer conduit.

23. A fluidized combustion bed system comprising:
a furnace;
a solids separator in fluid communication with the furnace; the furnace comprising a vortex finder; and
an outlet duct in fluid communication with the vortex finder; the outlet duct having a $NO_x$ reducing system located downstream of the vortex finder, the $NO_x$ reducing system comprising:
a first inner conduit in fluid communication with a reactant source; and
a first outer conduit comprising an open end for receiving the inner conduit and a closed end; the first outer conduit comprising a port for discharging reactant from the reactant source into an exhaust gas stream, wherein the port is located on a downstream side of the first outer conduit; the downstream side being defined by a flow direction of the exhaust gas stream.

24. The fluidized combustion bed system of claim 23, further comprising a second inner conduit in fluid communication with the reactant source; and a second outer conduit comprising an open end for receiving the second inner conduit and a closed end; the second outer conduit comprising a port for discharging reactant from the reactant source into an exhaust gas stream; wherein the second outer conduit is opposingly disposed to the first outer conduit.

25. The fluidized combustion bed system of claim 24, wherein the closed end of the first outer conduit is in physical communication with the closed end of the second outer conduit.

26. The fluidized combustion bed system of claim 25, wherein the outlet duct comprises a plurality of $NO_x$ reducing systems.

27. The fluidized combustion bed system of claim 25, wherein the outlet duct has an average of about 1 to about 5 $NO_x$ reducing systems per 10 linear feet of height of the outlet duct.

* * * * *